(12) United States Patent
Kim et al.

(10) Patent No.: US 11,885,729 B2
(45) Date of Patent: Jan. 30, 2024

(54) PARTICLE MATTER ANALYSIS DEVICE, ANALYSIS METHOD AND MANUFACTURING METHOD THEREOF

(71) Applicant: Industry-Academic Cooperation Foundation, Yonsei University, Seoul (KR)

(72) Inventors: Yong-Jun Kim, Seoul (KR); Hong-Beom Kwon, Seoul (KR)

(73) Assignee: INDUSTRY-ACADEMIC COOPERATION FOUNDATION, YONSEI UNIVERISTY, Seoul (KR)

( * ) Notice: Subject to any disclaimer, the term of this patent is extended or adjusted under 35 U.S.C. 154(b) by 778 days.

(21) Appl. No.: 16/929,509

(22) Filed: Jul. 15, 2020

(65) Prior Publication Data

US 2021/0109005 A1    Apr. 15, 2021

(30) Foreign Application Priority Data

Oct. 10, 2019 (KR) .................. 10-2019-0125440
Jun. 2, 2020 (KR) .................. 10-2020-0066435

(51) Int. Cl.
*G01N 15/06* (2006.01)
*B01D 57/02* (2006.01)
(Continued)

(52) U.S. Cl.
CPC .......... *G01N 15/0656* (2013.01); *B01D 57/02* (2013.01); *B03C 3/12* (2013.01);
(Continued)

(58) Field of Classification Search
CPC .. B03C 3/019; B03C 3/12; B03C 3/38; B03C 3/41; B03C 3/47; B01D 57/02;
(Continued)

(56) References Cited

U.S. PATENT DOCUMENTS 7,066,037 B2 * 6/2006 Keskinen ........... G01N 15/0266
73/865.5
7,131,343 B2 * 11/2006 Keskinen ........... G01N 15/0266
73/865.5
(Continued)

FOREIGN PATENT DOCUMENTS

EP       3614124        2/2020
JP    2015-016431 A    1/2015
(Continued)

OTHER PUBLICATIONS

Extended European Search Report dated Apr. 4, 2022 for European Patent Application No. 21175258.9.
(Continued)

*Primary Examiner* — Vinh P Nguyen
(74) *Attorney, Agent, or Firm* — Ohlandt, Greeley and Perle, LLP

(57) ABSTRACT

A particle matter analysis device, an analysis method and a manufacturing method are disclosed. The particle matter analysis device includes a charger configured to receive power from a power supply device and to charge particles included in intaken air, an electrophoretic mobility particle collector configured to collect particles having electrophoretic mobility greater than a predetermined electrophoretic mobility among the charged particles based on an electrophoretic mobility and to measure a current of electrophoretic mobility particles, an aerodynamic particle collector configured to collect charged particles passing through the electrophoretic mobility particle collector based on an inertial force of the charged particles and to measure a current of aerodynamic particles, a filter configured to collect charged particles passing through the aerodynamic particle collector and to measure a current of filtered particles, and a processor, wherein the processor calculates a density of the particles based on a ratio of the current of electrophoretic
(Continued)

mobility particles, the current of aerodynamic particles, and the current of filtered particles.

13 Claims, 20 Drawing Sheets

(51) Int. Cl.
| | | |
|---|---|---|
| *B03C 3/47* | (2006.01) | |
| *G01N 27/447* | (2006.01) | |
| *B03C 3/38* | (2006.01) | |
| *G01N 15/02* | (2006.01) | |
| *B03C 3/12* | (2006.01) | |
| *B03C 3/41* | (2006.01) | |

(52) U.S. Cl.
CPC ............ *B03C 3/38* (2013.01); *B03C 3/41* (2013.01); *B03C 3/47* (2013.01); *G01N 15/0266* (2013.01); *G01N 27/44756* (2013.01)

(58) Field of Classification Search
CPC ........... G01N 15/0266; G01N 15/0606; G01N 15/0656; G01N 2015/0038; G01N 2015/0046; G01N 27/44756
See application file for complete search history.

(56) References Cited

U.S. PATENT DOCUMENTS

| | | | | |
|---|---|---|---|---|
| 7,518,108 | B2* | 4/2009 | Frey | ............ H01J 49/165 |
| | | | | 250/281 |
| 10,488,316 | B2* | 11/2019 | Mizuno | ............ G01N 15/0656 |
| 2019/0028553 | A1 | 9/2019 | Okumura et al. | |
| 2019/0285534 | A1 | 9/2019 | Okumura et al. | |

FOREIGN PATENT DOCUMENTS

| | | |
|---|---|---|
| KR | 20030047379 | 6/2003 |
| KR | 20080105248 | 12/2008 |
| KR | 100931303 | 12/2009 |
| KR | 20160080382 | 7/2016 |
| KR | 20170117960 | 10/2017 |
| KR | 101854986 | 5/2018 |
| KR | 20180117907 | 10/2018 |
| WO | 03021235 | 3/2003 |

OTHER PUBLICATIONS

Kelly, "Measurement of particle density by inertial classification of differential mobility analyzer-generated monodisperse aerosols", Elsevier, Particle Technology Laboratory, Department of Mechanical Engineering, University of Minnesota, 1992, 14 pages.

* cited by examiner

PARTICLE MATTER ANALYSIS DEVICE, ANALYSIS METHOD AND MANUFACTURING METHOD THEREOF

CROSS-REFERENCE TO RELATED APPLICATIONS

This application is based on and claims priority under 35 U.S.C. 119 to Korean Patent Application No. 10-2019-0125440, filed on Oct. 10, 2019 and Korean Patent Application No. 10-2020-0066435, filed on Jun. 2, 2020, in the Korean Intellectual Property Office, the disclosures of which are herein incorporated by reference in their entireties.

BACKGROUND

Field

Apparatuses and methods consistent with the disclosure relate to a particle matter analysis device, an analysis method and a manufacturing method thereof, and more particularly, to a particle matter analysis device, an analysis method and a manufacturing method thereof capable of analyzing density of particles contained in the air in real time.

Description of the Related Art

Fine dust, especially, ultrafine dust having a small particle size, may have serious effects on human bodies in a short period of time even at low concentrations. In particular, ultrafine dust, which is not filtered by the lungs or bronchi, may cause cancer, pulmonary function inefficiency, cardiovascular disease, and the like and may penetrate directly into the skin and cause skin diseases such as atopic dermatitis. Therefore, the public awareness about ultrafine dust has significantly increased and demand for ultrafine dust concentration information has also increased.

Currently, PM monitoring is performed at designated air sampling stations, which are regulated by the US Environmental Protection Agency (EPA) and similar agencies in different countries. However, in urban areas, a flow of air and a diffusion pattern of ultrafine dust are very complicated due to high-rise buildings, so the concentration variations of ultrafine dust are significant even between adjacent areas. For this reason, it is difficult to accurately recognize a concentration distribution of ultrafine dust through a general wide area forecast system.

Meanwhile, a reference unit for measuring ultrafine dust is mass concentration. Most mass concentration measuring equipment collect ultrafine dust for a predetermined period of time and then measure a concentration of the collected ultrafine dust. This causes a problem that it is impossible to recognize a concentration of ultrafine dust in real time.

As a solution, a turbidity meter or an optical particle counter enabling real-time measurement is used. However, the turbidity meter is inexpensive but has low reliability and cannot obtain accurate data. The optical particle counter also calculates a mass concentration by uniformly applying a certain value as an average density of ultrafine dust, but the average density significantly varies depending on a source, composition, space, and time of the particles and cannot obtain an accurate mass concentration. In order to obtain an accurate average density value, high-priced analysis equipment such as a scanning mobility particle sizer (SMPS) or an electrical low pressure impactor (ELPI) may be used, but there is a limitation in that these equipment are operated only by skilled experts and are too large in size to be easily transported.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a particle matter analysis device which is compact and low in price and which is capable of precisely measuring density of ultrafine dust in real time in the field, and an analysis method and a manufacturing method thereof.

According to an embodiment of the disclosure, a particle matter analysis device includes: a charger configured to receive power from a power supply device and to charge particles included in intaken air; an electrophoretic mobility particle collector configured to collect particles having electrophoretic mobility greater than a predetermined electrophoretic mobility among the charged particles based on an electrophoretic mobility and to measure a current of electrophoretic mobility particles; an aerodynamic particle collector configured to collect charged particles passing through the electrophoretic mobility particle collector based on an inertial force of the charged particles and to measure a current of aerodynamic particles; a filter configured to collect charged particles passing through the aerodynamic particle collector and to measure a current of filtered particles; and a processor, wherein the processor calculates a density of the particles based on a ratio of the current of electrophoretic mobility particles, the current of aerodynamic particles, and the current of filtered particles.

The processor may be configured to calculate an overall current of the collected particles obtained by adding up the current of electrophoretic mobility particles, the current of aerodynamic particles, and the current of filtered particles, to calculate an average electrophoretic mobility particle diameter based on a ratio of the current of electrophoretic mobility particles to the calculated overall current, to calculate a dynamic overall current of the collected particles obtained by adding up the current of aerodynamic particles and the current of filtered particles, and to calculate a density of the particles based on the calculated average electrophoretic mobility particle diameter and the current of aerodynamic particles with respect to the calculated dynamic overall current.

The processor may be configured to calculate a total number concentration of the particles based on a predetermined log-normal distribution, a predetermined variance value of a particle distribution, and the calculated average electrophoretic mobility particle diameter.

The particle matter analysis device may further include: a nozzle including a multi-orifice including a plurality of flow paths arranged between the electrophoretic mobility particle collector and the aerodynamic particle collector and narrowing from the electrophoretic mobility particle collector toward the aerodynamic particle collector.

The aerodynamic particle collector may include: a first aerodynamic particle collector configured to collect charged particles passing through the electrophoretic mobility particle collector and to measure a first current of aerodynamic particles; and a second aerodynamic particle collector configured to collect charged particles passing through the first aerodynamic particle collector and to measure a second current of aerodynamic particles.

The processor may be configured to calculate an average electrophoretic mobility particle diameter, a variance value of particle distribution and a particle density based on the measured current of electrophoretic mobility particles, the first current of aerodynamic particles, the current of aerodynamic particles, and the current of filtered particles.

The electrophoretic mobility particle collector and the aerodynamic particle collector may be integrally formed on one chip through a micro-electro mechanical systems (MEMS) process.

The electrophoretic mobility particle collector may include: first and second electrodes spaced apart from each other in a facing manner in a direction perpendicular to a flow direction in which the charged particles move, wherein the first and second electrodes form a uniform electric field in a direction from the first electrode to the second electrode upon receiving a predetermined voltage from the power supply device, and the second electrode collects particles having an electrophoretic mobility greater than a predetermined electrophoretic mobility.

According to another embodiment of the disclosure, a particle matter analysis method includes: charging particles included in intaken air; collecting particles having an electrophoretic mobility greater than a predetermined electrophoretic mobility among the charged particles based on the electrophoretic mobility and measuring a current of electrophoretic mobility particles; collecting charged particles passing through an electrophoretic mobility particle collector based on an inertial force of the charged particles and measuring a current of aerodynamic particles; collecting charged particles passing through an aerodynamic particle collector and measuring a current of filtered particles; and calculating a density of the particles based on a ratio of the current of electrophoretic mobility particles, the current of aerodynamic particles, and the current of filtered particles.

The calculating of a density of particles may include calculating an overall current of the collected particles obtained by adding up the current of electrophoretic mobility particles, the current of aerodynamic particles, and the current of filtered particles, calculating an average electrophoretic mobility particle diameter based on a ratio of the current of electrophoretic mobility particles to the calculated overall current, calculating a dynamic overall current of the collected particles obtained by adding up the current of aerodynamic particles and the current of filtered particles, and calculating a density of the particles based on the calculated average electrophoretic mobility particle diameter and the current of aerodynamic particles with respect to the calculated dynamic overall current.

The particle matter analysis method may further include: calculating a total number concentration of the particles based on a predetermined log-normal distribution, a predetermined variance value of a particle distribution, and the calculated average electrophoretic mobility particle diameter.

The measuring of a current of aerodynamic particles may include collecting charged particles passing through the electrophoretic mobility particle collector and measuring a first current of aerodynamic particles, and collecting charged particles passing through a first aerodynamic particle collector and measuring a second current of aerodynamic particles.

The calculating of a density of particles may include calculating an average electrophoretic mobility particle diameter, a variance value of particle distribution and a particle density based on the measured current of electrophoretic mobility particles, the first current of aerodynamic particles, the second current of aerodynamic particles, and the current of filtered particles.

According to another embodiment of the disclosure, a manufacturing method of a particle matter analysis device includes: plating a metal thin film on a first substrate; forming a first electrode of an electrophoretic mobility particle collector by patterning the metal thin film plated on the first substrate; plating a metal thin film on a second substrate; forming a second electrode of an electrophoretic mobility particle collector and a collision electrode of an aerodynamic particle collector by patterning the metal thin film plated on the second substrate; plating a photosensitive film on the metal thin film with the electrodes of the second substrate formed thereon; forming a region of the electrophoretic mobility particle collector and a region of the aerodynamic particle collector by patterning the plated photosensitive film; activating a surface by plasma-treating the patterned photosensitive film; and bonding the first substrate and the second substrate.

The manufacturing method may further include packaging the outside of the bonded first substrate and the second substrate with a shielding case.

As described above, according to various embodiments of the disclosure, the particle matter analysis device, the analysis method and the manufacturing method thereof may accurately measure a density of particles contained in ultrafine dust in the air in real time.

The particle matter analysis device, the analysis method and the manufacturing method thereof may be embedded in a single integrated chip to enable miniaturization and low-cost production, facilitate transportation, and be easily applied to various industrial fields.

In addition, the particle matter analysis device, the analysis method and the manufacturing method thereof may calculate a mass concentration using a precisely calculated density value, thereby remarkably improving accuracy of measurement of the mass concentration, compared to the related art method of calculating a mass concentration by uniformly applying a certain density value.

Effects obtainable from the disclosure are not limited by the aforementioned effects and other unmentioned effects may be clearly understood from the following descriptions by a person skilled in the art to which the disclosure pertains.

BRIEF DESCRIPTION OF THE DRAWING FIGURES

The above and/or other aspects of the disclosure will be more apparent by describing certain embodiments of the disclosure with reference to the accompanying drawings, in which.

DETAILED DESCRIPTION OF THE EMBODIMENTS

Figure 1:
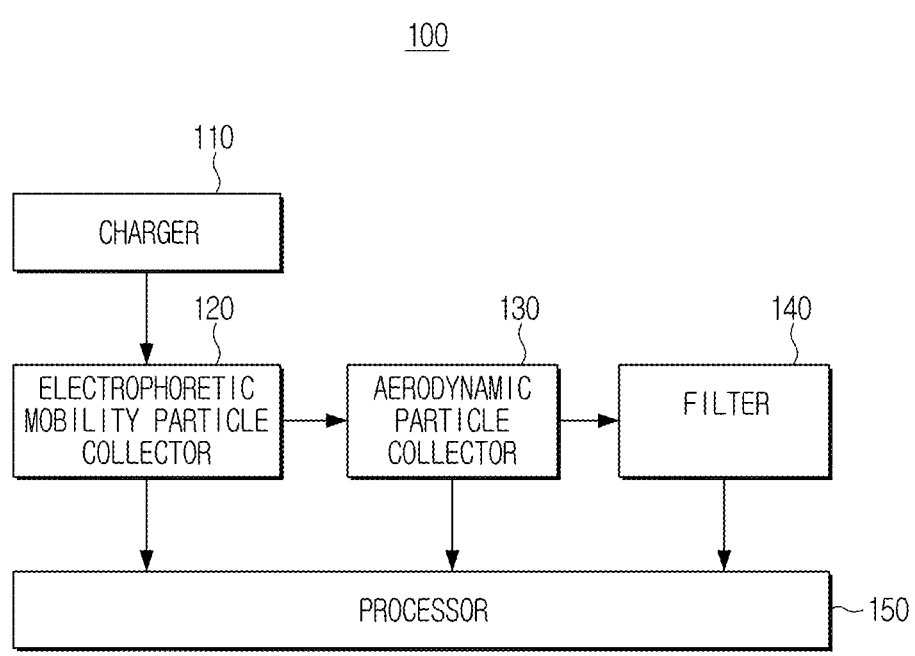
FIG. 1 is a block diagram of a particle matter analysis device according to an embodiment of the disclosure.

Hereinafter, various embodiments will be described in detail with reference to the accompanying drawings. The embodiments described herein may be variously modified. Specific embodiments may be illustrated in the drawings and described in detail in the detailed description. It should be understood, however, that the specific embodiments disclosed in the accompanying drawings are intended only to facilitate understanding of various embodiments. Therefore, the technical idea is not limited by the specific embodiments disclosed in the accompanying drawings but includes all equivalents or alternatives falling within the spirit and scope of the disclosure.

Terms including ordinals, such as first, second, etc., may be used to describe various elements but such elements are not limited to the above terms. The above terms are used only for the purpose of distinguishing one component from another.

In this specification, the terms "comprise" or "have" and the like, are intended to specify the presence of stated features, integers, steps, operations, elements, parts, or combinations thereof, but do not preclude the presence or addition of one or more other features, integers, steps, operations, elements, components, or combinations thereof. It is to be understood that when an element is referred to as being "connected" to another element, it can be directly on or directly connected to the other element or layer, or intervening elements or layers may be present. Meanwhile, when an element is referred to as being "directly connected" to another element, it should be understood that there are no other elements in between.

In the meantime, "module" or "part" for components used in the present specification performs at least one function or operation. Also, "module" or "part" may perform functions or operations by hardware, software, or a combination of hardware and software. Also, a plurality of "modules" or a plurality of "parts" except for a "module" or "part" to be performed in a specific hardware or performed in at least one processor may be integrated into at least one module. The singular expressions include plural expressions unless the context clearly dictates otherwise.

In the description of the disclosure, order of each step should be understood to be non-limiting, unless a preceding step must be performed logically and temporally before a subsequent step. In other words, except for the exceptional case above, even if a process described as a subsequent step is performed before a process described as a preceding step, the nature of the disclosure is not affected and the claim should be defined regardless of order of the steps. In this disclosure, "A or B" is defined to refer to include both A and B as well as selectively indicating either A or B. It is also to be understood that the term "comprise" is intended to encompass other elements in addition to the elements listed as being included.

Only essential components necessary for explanation of the disclosure are described in this specification, and components not related to the essence of the disclosure are not mentioned. It should not be construed in an exclusive sense that only the recited elements are included, but should be interpreted in a non-exclusive sense to include other elements as well.

In addition, in the description of the disclosure, when it is determined that a detailed description of known functions or components related thereto may unnecessarily obscure the gist of the disclosure, the detailed description thereof will be abbreviated or omitted. Meanwhile, each embodiment may be independently implemented or operated, but each embodiment may be implemented or operated in combination.

Figure 2:
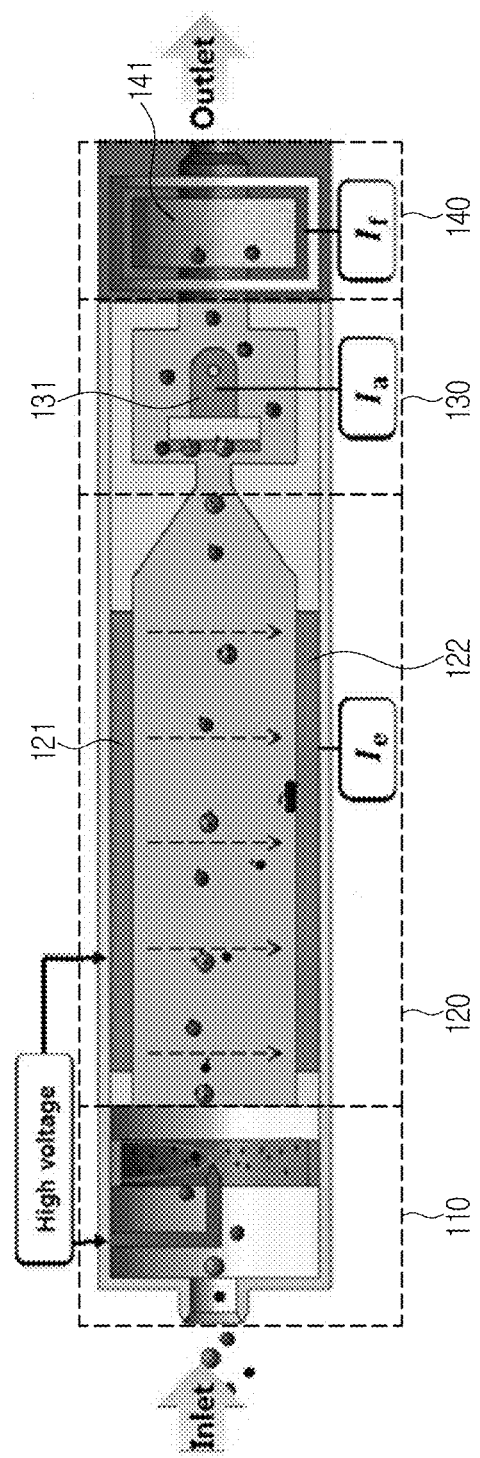
FIG. 2 is a view illustrating a particle matter analysis device according to an embodiment of the disclosure.

FIG. 1 is a block diagram of a particle matter analysis device according to an embodiment of the disclosure and FIG. 2 is a view illustrating a particle matter analysis device according to an embodiment of the disclosure. This will be described with reference to FIGS. 1 and 2.

Referring to FIGS. 1 and 2, a particle matter analysis device 100 may include a charger 110, an electrophoretic mobility particle collector 120, an aerodynamic particle collector 130, a filter 140, and a processor 150.

The charger 110 may receive air including particles (e.g., dust, fine dust, ultrafine dust, etc.) through an inlet. For example, the ultrafine dust may be nanoparticles having a diameter of 0.3 μm or smaller or micron particles having a diameter of 2.5 μm to 0.3 μm. Also, the charger 110 may be applied with a high voltage from a power supply (not shown). The charger 110 may charge introduced particles with the applied high voltage. That is, particles introduced through the inlet may be charged in the charger 110. The particles charged in the charger 110 may move to the electrophoretic mobility particle collector 120.

The electrophoretic mobility particle collector 120 may collect particles having an electrophoretic mobility greater than a predetermined electrophoretic mobility among the charged particles based on the electrophoretic mobility. The electrophoretic mobility particle collector 120 may include an ammeter and measure a current of particles collected at the electrophoretic mobility particle collector 120 (hereinafter called "a current of electrophoretic mobility particles"). The electrophoretic mobility particle collector 120 may include two electrodes 121 and 122 arranged to be spaced apart from each other on the left and right (or upper and lower sides) with reference to a direction of movement of the charged particles. The two electrodes 121 and 122 may be formed in a plate shape. The plate-shaped electrodes 121 and 122 spaced apart from each other may be applied with a high voltage from a power supply. A uniform electric field may be formed between the electrodes 121 and 122 to which high voltage is applied. When the charged particles pass between the electrodes 121 and 122 where the electric field is formed, some particles having an electrophoretic mobility greater than a constant electrophoretic mobility due to the electric field may be collected by the electrophoretic mobility particle collector 120. Since the collected partial particles are charged, the electrophoretic mobility particle collector 120 may measure a current from the collected particles. The current measured by the electrophoretic mobility particle collector 120 may be a current of electrophoretic mobility particles $I_e$. Particles that are not collected by the electrophoretic mobility particle collector 120 may move to the aerodynamic particle collector 130.

The aerodynamic particle collector 130 includes a collision electrode 131, and the collision electrode 131 may collect some particles having a large inertial force based on the inertial force of the charged particles. The aerodynamic particle collector 130 may include an ammeter and measure a current from the collected particles. The current measured by the aerodynamic particle collector 130 may be a current of aerodynamic particles $I_a$. Particles that are not collected in the aerodynamic particle collector 130 may move to the filter 140.

The filter 140 may include a filter electrode 141. The filter electrode 141 may collect the other remaining particles that are not collected by the electrophoretic mobility particle collector 120 and the aerodynamic particle collector 130. The filter 140 may also include an ammeter and measure a current from the collected particles. The current measured by the filter 140 may be a current of filtered particles $I_f$.

The particles introduced together with air into the particle matter analysis device 100 may be collected by all of the electrophoretic mobility particle collector 120, the aerodynamic particle collector 130, and the filter 140. Accordingly, the sum of the current of electrophoretic mobility particles $I_e$, the current of aerodynamic particles $I_a$, and the current of filtered particles $I_f$ is equal to a total current $I_{tot}$ of the charged particles in the charger 110. The introduced air may be discharged through an outlet.

The processor 150 may receive the current of electrophoretic mobility particles, the current of aerodynamic particles, and the current of filtered particles from the electrophoretic mobility particle collector 120, the aerodynamic particle collector 130, and the filter 140, respectively. The processor 150 may calculate an average electrophoretic mobility particle diameter, an average density of an average aerodynamic particle diameter, an average charge amount, a number concentration of particles, a particle mass concentration, and the like based on a ratio of the received current of electrophoretic mobility particles, current of aerodynamic particles, and current of filtered particles.

Meanwhile, the particle matter analysis device 100 may further include a particle separator (not shown). The particle separator may be disposed on a front portion of the charger 110 to separate particles to be analyzed from particles introduced with air. That is, particles in the air may be separated into particles to be analyzed (or analysis target particles) and particles not to be analyzed, while passing through the particle separator, and the separated particles to be analyzed may be introduced into the particle matter analysis device 100. For example, the particle separator may be a virtual impactor that separates specific particles using an inertial force.

For example, the analysis target particles may be nanoparticles having a diameter of 0.3 μm or smaller. When the analysis target particles are nanoparticles, the particle separator may selectively separate the nanoparticles from the particles in the air for analysis. As an embodiment, the particle separator may include an inlet through which air flows, a low-speed flow path extending in the same direction as that of the inlet, and a high-speed flow path extending in a direction perpendicular to the inlet and low-speed flow path. The particle separator may selectively separate nanoparticles in the air using an inertial force. Specifically, among the particles in the air introduced into the inlet port, micron particles having a relatively high inertia may move in the low-speed flow path by maintaining a linear motion, and nanoparticles having a relatively small size may move in the high-speed flow path due to a small inertia. Accordingly, only the nanoparticles may be selectively separated from the air. The separated nanoparticles may be introduced into the particle matter analysis device 100 connected to the high-speed flow path.

Alternatively, the analysis target particles may be micron particles having a diameter between 2.5 μm and 0.3 μm, particles having a diameter of 2.5 μm or smaller, or particles having a particle diameter within a specific range. For example, the particle separator may separate particles having a diameter of 2.5 μm or smaller and supply them to the particle matter analysis device 100, and the particle matter analysis device 100 may calculate a density or the like of the separated particles. That is, the particle matter analysis device 100 may be applied to any particles, and the size of the analysis target particles may be appropriately selected according to purposes of analysis.

A specific configuration of the particle matter analysis device 100 and a process of analyzing particles will be described later.

Figure 3:
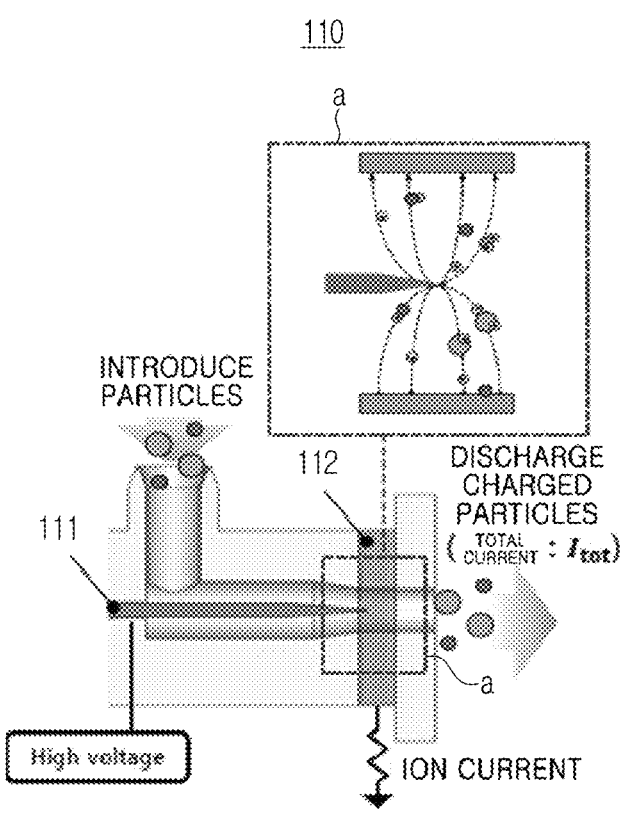
FIG. 3 is a view illustrating a charger according to an embodiment of the disclosure.
Figure 4:
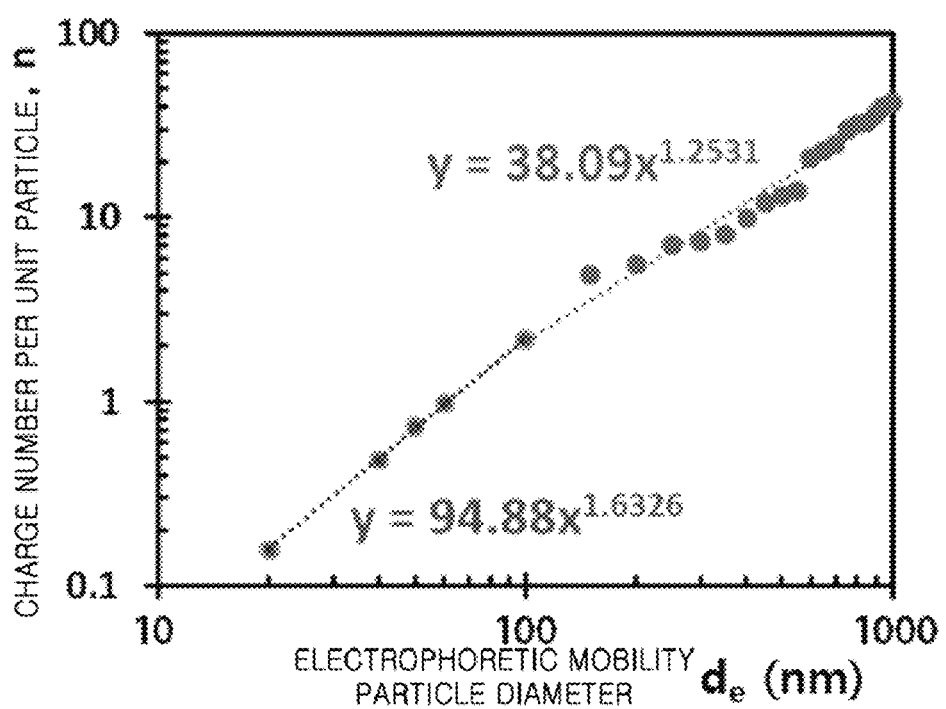
FIG. 4 is a graph showing the number of charges per unit particle based on an electrophoretic mobility particle diameter according to an embodiment of the disclosure.

FIG. 3 is a view illustrating a charger according to an embodiment of the disclosure and FIG. 4 is a graph showing the number of charges per unit particle based on an electrophoretic mobility particle diameter according to an embodiment of the disclosure. This will be described with reference to FIGS. 3 and 4.

The charger 110 may electrically charge particles introduced with air to generate charged particles. For example, the charger 110 may charge particles using corona discharge. Corona discharge, a form of gas discharge, is a phenomenon in which discharge occurs when a high voltage is applied to a tip-shaped electrode. The charger 110 may include a tip-shaped electrode 111 and a ring-shaped electrode 112. The tip-shaped electrode 111 may be a discharge electrode including a conductive metal and the ring-shaped electrode 112 may be a ground electrode including a conductive metal.

For example, the conductive metal may include copper, tungsten, aluminum, stainless steel, and the like.

Particles together with air may be introduced through the inlet into the charger 110 of the particle matter analysis device 100. The outlet of the charger 110 and the inlet of the electrophoretic mobility particle collector 120 may be connected to each other. Accordingly, the introduced particles may pass through the inside of the ring-shaped electrode 112 and move to the electrophoretic mobility particle collector 120.

An enlarged view of the tip-shaped electrode 111 and the ring-shaped electrode 112 is shown in a. The ring-shaped electrode 112 may be disposed on an inner surface of the charger 110. The ring-shaped electrode 112 may be formed in a circular, elliptical, or polygonal shape according to an inner shape of the charger 110. The tip-shaped electrode 111 may be spaced apart from the ring-shaped electrode 112 and disposed at a central region. The tip-shaped electrode 111 may generate corona discharge from a tip end to the ring-shaped electrode 112 when a high voltage is applied from the power supply. Electrons around the tip end are accelerated to collide with air molecules, and the air molecules may be separated into cations and electrons due to the collision. The separated cations may adhere to particles passing between the tip-shaped electrode 111 and the ring-shaped electrode 112 to generate charged particles.

Referring to FIG. 4, a graph of the number of charges per unit particle based on an electrophoretic mobility particle diameter of the charger 110 according to an embodiment is illustrated. The number of charges per particle of the charger 110 may be expressed as Equation 1.

$$n(d_e) = \alpha \cdot d_e^\beta \qquad \text{(Equation 1)}$$

Here, $n(d_e)$ is the number of charges per unit particle and $\alpha$, $\beta$ are constants.

That is, the number of charges per particle of the charger 110 may be fitted as a power-law function according to the size of the particles. The particles charged in the charger 110 may move to the electrophoretic mobility particle collector 120.

A current value due to charged particles having a specific particle diameter may be expressed as Equation 2, and a total current value of charged particles may be expressed as Equation 3.

$$I(d_e) = e \cdot n(d_e) \cdot Q \cdot N(d_e) \qquad \text{(Equation 2)}$$

Here, $I(d_e)$ is current, e is unit charge amount and Q is flow rate.

$$I_{tot} = I_e + I_a + I_f = \int I(d_e) dd_e = e \cdot Q \int n(d_e) \cdot N(d_e) dd_e \qquad \text{(Equation 3)}$$

Figure 5:
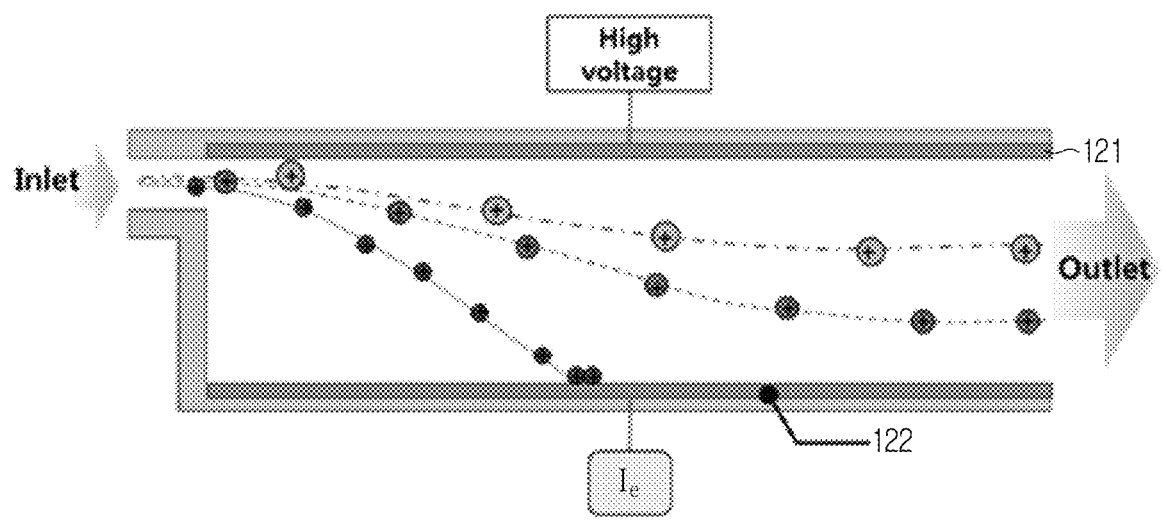
FIG. 5 is a view illustrating an electrophoretic mobility particle collector according to an embodiment of the disclosure.
Figure 6:
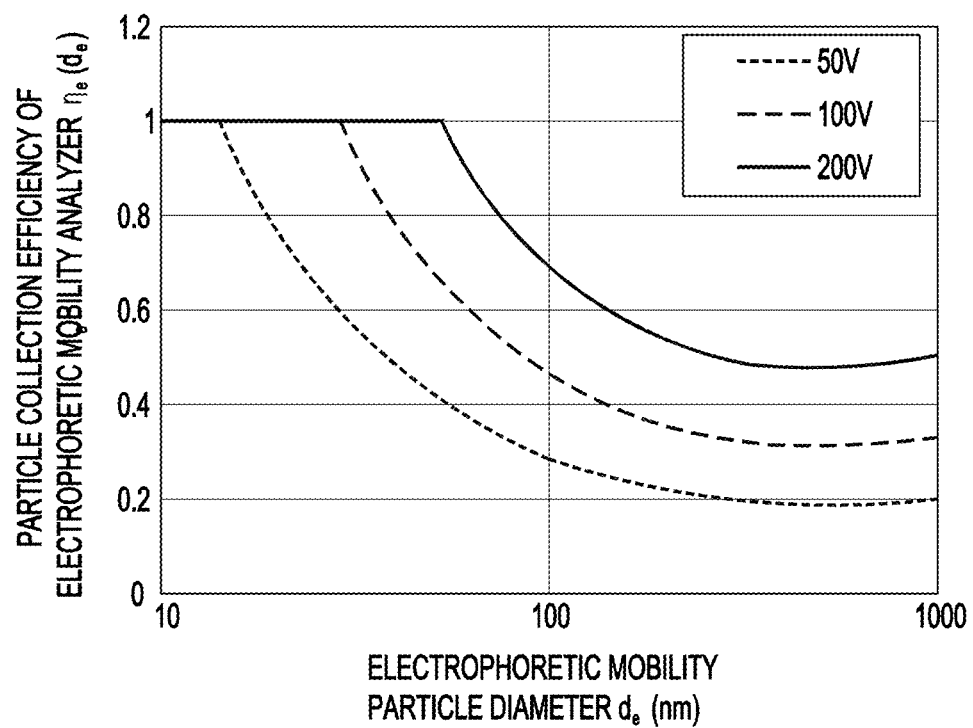
FIG. 6 is a graph showing collection efficiency based on an electrophoretic mobility particle diameter according to an embodiment of the disclosure.

FIG. 5 is a view illustrating an electrophoretic mobility particle collector according to an embodiment of the disclosure, and FIG. 6 is a graph showing collection efficiency based on an electrophoretic mobility particle diameter according to an embodiment of the disclosure. This will be described with reference to FIGS. 5 and 6.

An inlet of the electrophoretic mobility particle collector 120 may be connected to an outlet of the charger 110. Thus, the particles charged in the charger 110 may be moved to the electrophoretic mobility particle collector 120. The charged particles may be introduced into the inlet of the electrophoretic mobility particle collector 120 and may be discharged through an outlet located in the opposite direction (e.g., moved in an X-axis direction). As shown in FIG. 5, a cross-sectional area of an internal space of the electrophoretic mobility particle collector 120 may be larger than that of the inlet of the electrophoretic mobility particle collector 120. Therefore, the charged particles may spread in the internal space (channel) of the electrophoretic mobility particle collector 120 and move in an exit direction. The electrophoretic mobility particle collector 120 may include a first electrode 121 and a second electrode 122. The first and second electrodes 121 and 122 may include a conductive metal such as copper, tungsten, aluminum, and stainless steel. The first and second electrodes 121 and 122 may be arranged at positions perpendicular to a flow path direction in which the charged particles move. The first and second electrodes 121 and 122 may be disposed on both inner surfaces of the electrophoretic mobility particle collector 120 in a facing manner. The first and second electrodes 121 and 122 may be formed in a plate shape. The first and second electrodes 121 and 122 may receive a predetermined voltage from a power supply. For example, the first electrode 121 may be applied with a predetermined voltage, and the second electrode 122 may be grounded. When the first and second electrodes 121 and 122 are applied with a voltage, a uniform electric field may be formed in a direction of the second electrode 122 from the first electrode 121 in the internal space of the electrophoretic mobility particle collector 120 (e.g., Y-axis direction). The particles which are charged as positive charges by the formed electric field may be forced in a direction of the electric field. The charged particles may have a first velocity vector component (e.g., X-axis direction) based on air flow and a second velocity vector component (e.g., Y-axis direction) based on the electric field and move in a direction of the sum of the first velocity vector component and the second velocity vector component. The charged particles having a large size of the second velocity vector component may move in the direction of the second electrode 122 and may be collected in the second electrode 122. Thus, the second electrode 122 may collect particles having an electrophoretic mobility greater than a predetermined electrophoretic mobility. Meanwhile, particles having a small size of the second velocity vector component may not be collected and may move in the exit direction.

The size of the second velocity vector component may be represented by the electrophoretic mobility of the charged particles as shown in Equation 4. That is, the electrophoretic mobility may refer to a velocity of the charged particles in a unit electric field, and as particles have larger electrophoretic mobility, a velocity thereof in the electric field direction may increase.

$$Z_e(d_e) = \frac{enC}{3\pi\mu} \times \frac{1}{d_e} \qquad \text{(Equation 4)}$$

Here, $Z_e$ is electrophoretic mobility of the particles, e is unit charge amount, C is Cunningham slip correction factor, $\mu$ is gas viscosity, n is the number of charges attached to particles, and $d_e$ is electrophoretic mobility particle diameter.

Therefore, as shown in Equation 4, particles having a small electrophoretic mobility particle diameter has large electrophoretic mobility (second velocity vector component), and particles having a large electrophoretic mobility particle diameter may have small electrophoretic mobility (second velocity vector component). Therefore, charged particles having an electrophoretic mobility particle diameter smaller than or equal to a predetermined value may be collected by the second electrode 122, and charged particles having an electrophoretic mobility particle diameter exceeding the predetermined value may not be collected by the second electrode 122 and may be moved to the aerodynamic particle collector 130 through the outlet. That is, the predetermined value may be an upper limit value of the electrophoretic mobility particle diameter of the charged particles collected in the second electrode 122.

Meanwhile, a ratio (collection efficiency) $\eta_e$ of charged particles collected by the electrophoretic mobility particle collector 120 may be adjusted according to a magnitude of a voltage difference between the first electrode 121 and the second electrode 122 (or voltage applied to the first electrode). The collection efficiency of the electrophoretic mobility particle collector 120 may be expressed as shown in Equation 5.

$$\eta_e(d_e) = \frac{Z_e(d_e)L_e w_e}{Q_{air} h} V_e \quad \text{(Equation 5)}$$

Here, $\eta_e$ is collection efficiency, Ze is electrophoretic mobility of particles, $L_e$ is channel length of electrophoretic mobility particle collector, we is channel width, $V_e$ is voltage applied to the electrophoretic mobility particle collector, and $Q_{air}$ is sampling flow rate, and h is channel height.

Referring to FIG. 6, when the voltage applied to the first electrode 121 is increased, the upper limit value of the electrophoretic mobility particle diameter of the charged particles collected in the second electrode 122 may also be increased. Therefore, the electrophoretic mobility particle collector 120 may selectively control the upper limit value of the electrophoretic mobility particle diameter of the collected charged particles by adjusting the magnitude of the voltage applied to the first electrode 121. Therefore, the electrophoretic mobility particle collector 120 may selectively collect all particles included in ultrafine dust, such as nanoparticles, micron particles, and other particles, based on the electrophoretic mobility particle diameter.

The amount of charged particles collected by the second electrode 122 may be measured as a current value. That is, the current value $I_e$ measured at the second electrode 122 may vary depending on the amount of collected charged particles. The outlet of the electrophoretic mobility particle collector 120 and the inlet of the aerodynamic particle collector 130 may be connected to each other. Accordingly, charged particles that are not collected by the electrophoretic mobility particle collector 120 may move to the aerodynamic particle collector 130.

Figure 7:
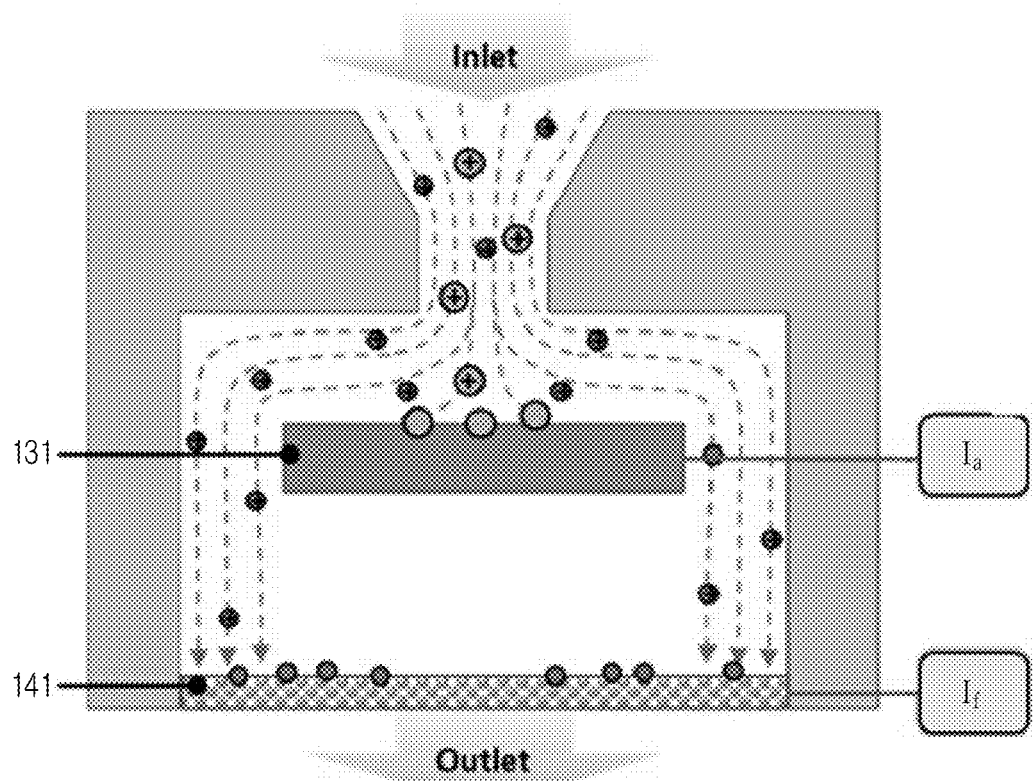
FIG. 7 is a view illustrating an aerodynamic particle collector and filter according to an embodiment of the disclosure.
Figure 8:
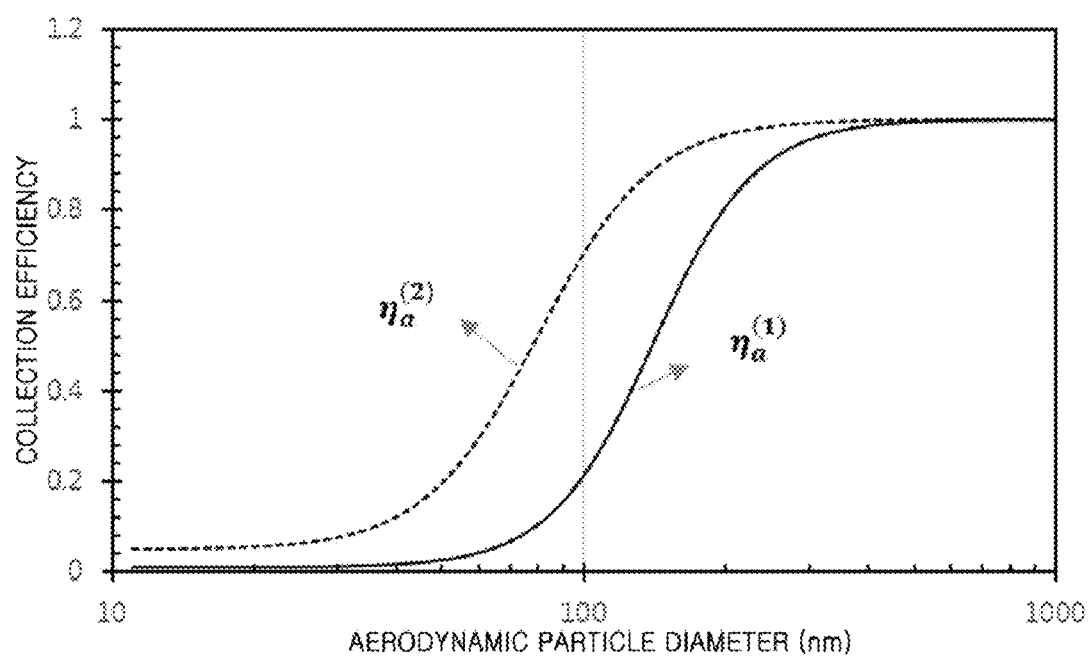
FIG. 8 is a graph showing collection efficiency based on an aerodynamic particle diameter according to an embodiment of the disclosure.

FIG. 7 is a view illustrating an aerodynamic particle collector and a filter according to an embodiment of the disclosure, and FIG. 8 is a graph showing collection efficiency based on an aerodynamic particle diameter according to an embodiment of the disclosure. This will be described with reference to FIGS. 7 and 8.

The inlet of the aerodynamic particle collector 130 may be connected to the outlet of the electrophoretic mobility particle collector 120. Accordingly, charged particles that are not collected by the electrophoretic mobility particle collector 120 may move to the aerodynamic particle collector 130. In the disclosure, a part from the outlet of the electrophoretic mobility particle collector 120 to the inlet of the aerodynamic particle collector 130 will be referred to as a nozzle. The nozzle may be formed such that a cross-sectional area of the inlet of the aerodynamic particle collector 130 is smaller than a cross-sectional area of the outlet of the electrophoretic mobility particle collector 120. That is, as illustrated in FIG. 7, a shape (shape of the nozzle) of the part from the outlet of the electrophoretic mobility particle collector 120 to the inlet of the aerodynamic particle collector 130 may be formed in a funnel shape. As a flow path moving from the electrophoretic mobility particle collector 120 to the aerodynamic particle collector 130 is formed in a funnel shape that gradually narrows, the charged particles on the move may be accelerated. The aerodynamic particle collector 130 may include a collision electrode 131. For example, the collision electrode 137 may have a plate shape and may include a conductive metal such as copper, tungsten, aluminum, and stainless steel. The collision electrode 131 may be disposed in a direction perpendicular to a flow direction of the charged particles moved to the aerodynamic particle collector 130. Therefore, a movement direction of the charged particles introduced into the aerodynamic particle collector 130 may be changed from the direction perpendicular to the collision electrode 131 to a horizontal direction. However, because the particles having a large aerodynamic particle diameter have a large inertial force, the force in the movement direction may be greater than the force of the collision electrode 131 and the horizontal direction. Therefore, particles having a large inertial force may be collected by the collision electrode 131. That is, charged particles having an aerodynamic particle diameter equal to or greater than a predetermined value may be collected by the collision electrode 131, and charged particles having an aerodynamic particle diameter smaller than the predetermined value may move by bypassing the collision electrode 131.

An aerodynamic particle diameter of the particles in which the number of particles collected by the collision electrode 131 and the number of bypassing particles are equal is a cut-off diameter and may be expressed as Equation 6.

$$d_{a,50} = \sqrt{\frac{9\mu W_a^2 t Stk_{50}}{\rho_p C_c Q_{air}}} \quad \text{(Equation 6)}$$

Here, $d_{a,50}$ is aerodynamic particle diameter, $\mu$ is gas viscosity, $W_a$ is nozzle width of aerodynamic particle collector, $Stk_{50}$ is Stokes number of cut-off diameter, $\rho_p$ is particle density, Cc is Cunningham slip correction factor, and $Q_{air}$ is sampling flow rate.

A shape of the aerodynamic particle collector may be designed with reference to Equation 6. In addition, Equation 6 may be used to calculate an average aerodynamic particle diameter based on a current ratio of the current $I_a$ measured by the aerodynamic particle collector 130 and the current $(I_a+I_f)$ of the particles introduced into the aerodynamic particle collector.

FIG. 8 shows a graph of particle collection efficiency based on an aerodynamic particle diameter according to an embodiment. That is, because particles having a large inertial force has higher collection efficiency, and thus, collection efficiency of the aerodynamic particle collector 130 may increase as the particle diameter of particles increases.

The amount of charged particles collected by the collision electrode 131 may be measured as a current value. That is, the current value $I_a$ measured by the collision electrode 131 may vary depending on the amount of collected charged particles. The filter 140 may be located below the aerodynamic particle collector 130.

The filter 140 may collect all the remaining charged particles that are not collected by the aerodynamic particle collector 130. The filter 140 may include a filter electrode 141. For example, the filter electrode 141 may be formed in a plate shape and may include a conductive metal such as copper, tungsten, aluminum, and stainless steel. The filter electrode 141 may be disposed in a direction perpendicular to a flow direction of the charged particles. The amount of charged particles collected by the filter 141 may be measured as a current value. That is, the current value $I_f$ measured at the filter electrode 141 may vary depending on the amount of collected charged particles.

As described above, the particles charged in the charger 110 are collected by the electrophoretic mobility particle collector 120, the aerodynamic particle collector 130, and the filter 140, and each unit may measure the current of electrophoretic mobility particles $I_e$, the current of aerodynamic particles $I_a$, and the current of filtered particles $I_f$. Because the charged particles are all collected in each unit, a total current $I_{tot}$ of the charged particles is equal to the sum of the current of electrophoretic mobility particles $I_e$, the current of aerodynamic particles $I_a$, and the current of filtered particles $I_f$. The current of electrophoretic mobility particles $I_e$, the current of aerodynamic particles $I_a$, and the current of filtered particles $I_f$ measured at each unit are delivered to the processor, and the processor may calculate a density or the like of the particles based on the delivered current.

Figure 9:
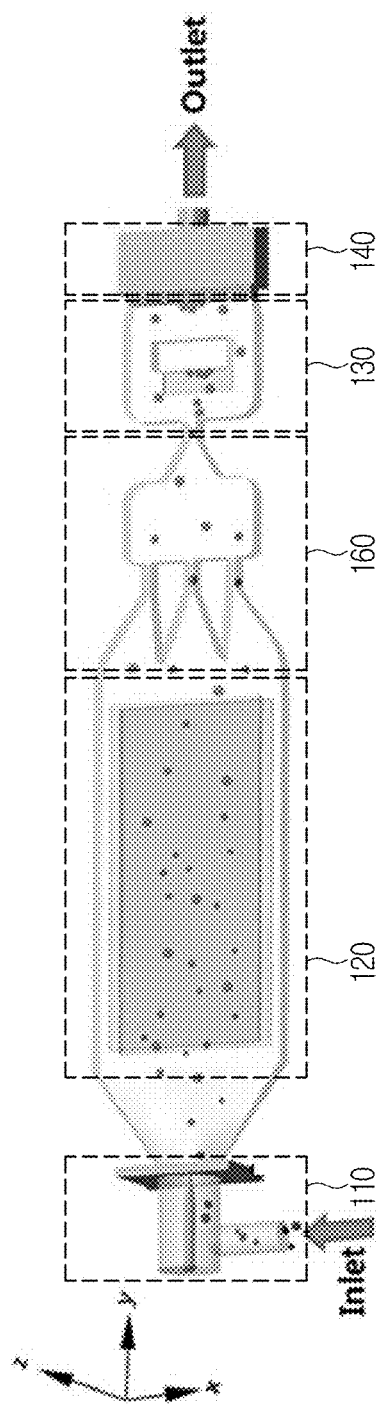
FIG. 9 is a view illustrating a particle matter analysis device including a nozzle formed with a multi-orifice according to an embodiment of the disclosure.

FIG. 9 is a view illustrating a particle matter analysis device including a nozzle formed with a multi-orifice according to an embodiment of the disclosure.

The particle matter analysis device 100 illustrated in FIG. 9 includes a charger 110, an electrophoretic mobility particle collector 120, an aerodynamic particle collector 130, a filter 140, and a nozzle 160. The charger 110, the electrophoretic mobility particle collector 120, the aerodynamic particle collector 130, and the filter 140 are the same as those described above, and thus a duplicate description will be omitted.

The nozzle 160 may be disposed between the electrophoretic mobility particle collector 120 and the aerodynamic particle collector 130 and include a multi-orifice including a plurality of flow paths narrowing in the direction to the aerodynamic particle collector 130 from the electrophoretic mobility particle collector 120.

When a vacuum pump reduces pressure of the orifice, a flow velocity (flow velocity of air containing particles) is generated in the orifice due to a pressure difference, and the flow velocity may increase as the pressure difference increases. However, because the flow velocity cannot be greater than a sound velocity, a chocked flow phenomenon in which the flow velocity is equal to the sound velocity may occur even if the pressure at an outlet of the orifice is lowered. Since the flow velocity becomes equal to the sound velocity, a constant flow rate may be supplied to the aerodynamic particle collector 130. Therefore, the particle matter analysis device of the disclosure may supply a constant flow rate without a flow sensor through a critical orifice provided therein. In case of the chocked flow, the flow rate may be calculated using an orifice nozzle width, the number of nozzles, and Equation 7.

$$Q_{air} = c_o n_o w_o h \sqrt{\frac{\lambda_{air} P_{air}}{\rho_{air}} \left(\frac{2}{\lambda+1}\right)^{\frac{\lambda+1}{\lambda-1}}} \quad \text{(Equation 7)}$$

Here, $Q_{air}$ is flow rate, $c_o$ is discharge coefficient=0.8 (in case of a rectangular orifice), $n_o$ is critical orifice number, wo is critical orifice width, h is channel height, $P_{air}$ is air pressure (atmospheric pressure 1 atm), $\rho_{air}$ is air density (atmospheric pressure 1.23 kg/m³), and $\lambda_{air}$ is specific heat ratio of air=1.4.

The nozzle may be a single orifice or may be a nozzle realized as a multi-orifice including a plurality of orifices. As the number of orifices increases, an area in which air circulates at a rear end of an electrophoretic mobility particle diameter analyzer may be minimized, thus increasing stability of classification efficiency. As an embodiment, a flow rate range may be 0.3 to 3 LPM, and the number of nozzles may be calculated by Equation 7.

As described above, each component of the particle matter analysis device of the disclosure may measure the current from the collected charged particles. The measured current may be delivered to the processor. The processor may analyze the particles based on the delivered current. That is, the particle matter analysis device may analyze the particles by measuring only the current. First, a process in which the processor receives the measured current and calculates a density will be described.

Assuming that a size distribution of particles introduced into the particle matter analysis device follows a log-normal distribution, a particle size distribution may be expressed as Equation 8.

$$N(d_e) = \frac{N_{tot}}{\sqrt{2\pi} \log \sigma \cdot d_e} \exp\left[\frac{\log d_e - \log d_{e,m}}{\log \sigma}\right]^2 \quad \text{(Equation 8)}$$

Here, $N(d_e)$ is particle size distribution, $N_{tot}$ is total number concentration, $\sigma$ is variance value, and $d_{e,m}$ is an average electrophoretic mobility particle diameter.

A ratio (first current ratio) of the current based on the charged particles collected by the electrophoretic mobility particle collector 120 to a total current may be expressed as Equation 9.

$$R_1 = \frac{I_a}{I_{tot}} = \frac{\int \eta_e(d_e) \cdot n(d_e) \cdot N(d_e) dd_e}{\int n(d_e) \cdot N(d_e) dd_e} = \quad \text{(Equation 9)}$$

$$\frac{\int_{d_{e,min}}^{d_{e,max}} \eta_e(d_e) \cdot n(d_e) \cdot \frac{1}{d_e} \exp\left(\frac{\log d_e - \log d_{e,m}}{\log \sigma}\right)^2 dd_e}{\int_{d_{e,min}}^{d_{e,max}} n(d_e) \cdot \frac{1}{d_e} \exp\left(\frac{\log d_e - \log d_{e,m}}{\log \sigma}\right)^2 dd_e}$$

Here, $\eta_e$ is collection efficiency of electrophoretic mobility particle collector, $n(d_e)$ is the number of charges per unit particle, $d_e$ is electrophoretic mobility particle diameter, $d_{e,m}$ is average electrophoretic mobility particle diameter, and $\sigma$ is variance value.

As described above, the collection efficiency $\eta_e$ may be controlled by controlling a voltage applied to the first electrode. The charge number per unit particle $n(d_e)$ may be obtained from Equation 1, and the electrophoretic mobility particle diameter $d_e$ in Equation 6 may be treated as a constant. If the variance value $\sigma$ is assumed to be a specific value (e.g., 1.6 or 1.8), an unknown in Equation 9 is only the average electrophoretic mobility particle diameter of the particles. Therefore, the average electrophoretic mobility particle diameter $d_{e,m}$ of the particles may be calculated from Equation 9.

A ratio (second current ratio) of the current due to the charged particles collected by the aerodynamic particle collector to the current due to the charged particles introduced into the aerodynamic particle collector may be expressed as Equation 10.

$$R_2 = \frac{I_a}{I_a + I_f} = \frac{\int (1 - \eta_e(d_e)) \cdot n_a(d_a) \cdot n(d_e) \cdot N(d_e) dd_e}{\int (1 - \eta_e(d_e)) \cdot n(d_e) \cdot N(d_e) dd_e} = $$

$$\frac{\int_{d_{e,min}}^{d_{e,max}} (1 - \eta_e(d_e)) \cdot \eta_a(d_e, \rho_{eff}) \cdot n(d_e) \cdot \frac{1}{d_e} \exp\left(\frac{\log d_e - \log d_{e,m}}{\log \sigma}\right)^2 dd_e}{\int_{d_{e,min}}^{d_{e,max}} (1 - \eta_e(d_e)) \cdot n(d_e) \cdot \frac{1}{d_e} \exp\left(\frac{\log d_e - \log d_{e,m}}{\log \sigma}\right)^2 dd_e}$$

(Equation 10)

Here, $\eta_a$ is collection efficiency of the aerodynamic particle collector, and $\rho_{eff}$ is density.

Equation 10 may be expressed by modifying and substituting a density equation, Equation 11.

$$\rho_{eff} = \frac{C_c(d_a) \cdot d_a^2}{C_c(d_e) \cdot d_e^2}$$

(Equation 11)

Here, $\rho_0$ is unit density (1 g/cm$^3$), Cc is Cunningham slip correction factor, $d_a$ is aerodynamic particle diameter, and $d_e$ is electrophoretic mobility particle diameter.

Therefore, because the average electrophoretic mobility particle diameter $d_{e,m}$ of the particles is calculated from Equation 9, density of the particles may be calculated from Equation 10. That is, the particle matter analysis device may calculate an average electrophoretic mobility particle diameter and density of particles using only the measured current. In addition, a total number concentration may be calculated using the calculated average electrophoretic mobility particle diameter of the particles and Equation 8.

Meanwhile, the particle matter analysis device may further include a memory (not shown). The particle matter analysis device may generate a relationship between the measured currents $I_e$, $I_a$, and $I_f$ and the density of the particles $\rho_{eff}$ as a database and store the generated database in the memory. That is, the processor may retrieve the density from the database, without calculating the density each time it is measured. Therefore, the particle matter analysis device may reduce a density calculation time and a calculation load. For example, the particle matter analysis device may store the relation data between the first current ratio $R_1$ and the average electrophoretic mobility particle diameter $d_{e,m}$ and the relation data between the average electrophoretic mobility particle diameter $d_{e,m}$ and an effective density based on the second current ratio $R_2$ in the memory. Therefore, the particle matter analysis device may immediately calculate the density when only a measured current is input. In addition, the particle matter analysis device may further include an outputter (not shown) for providing analysis information of particles to a user. For example, the outputter may be realized as a speaker or display.

Meanwhile, the particle matter analysis device may include a plurality of aerodynamic particle collectors.

Figure 10:
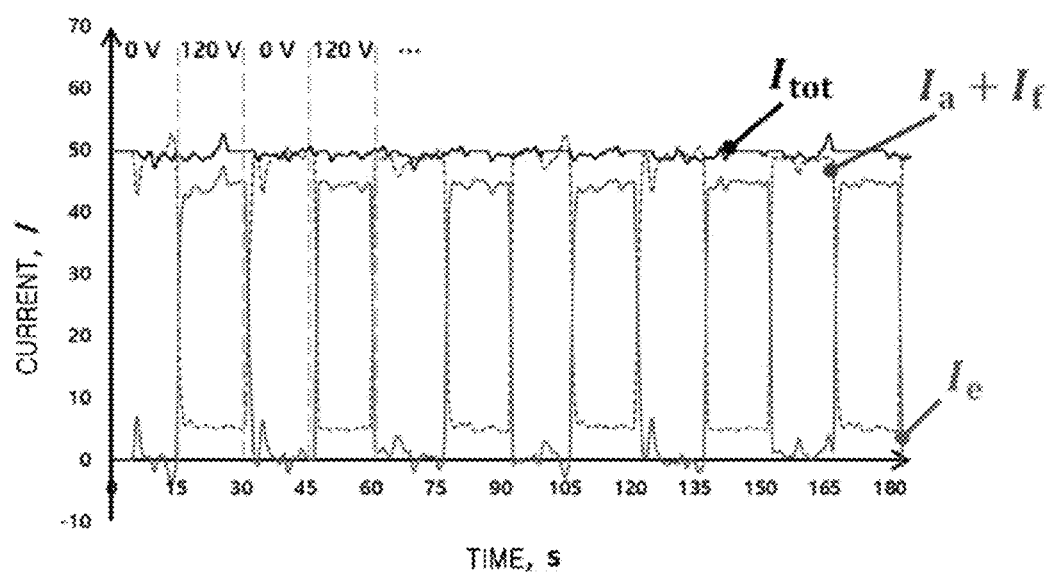
FIG. 10 is a view illustrating an embodiment of applying a high voltage to an electrophoretic mobility particle collector at regular periods.

FIG. 10 is a view illustrating an embodiment of applying a high voltage to an electrophoretic mobility particle collector at regular periods.

As described above, particles introduced into the particle matter analysis device may be charged by a high voltage applied to the charger. In addition, an electric field is formed by a high voltage applied to the electrophoretic mobility particle collector, and charged particles having an electrophoretic mobility of a predetermined size or greater may be collected by the electrophoretic mobility particle collector by the generated electric field. Charged particles that are not collected by the electrophoretic mobility particle collector may be collected by the aerodynamic particle collector or the filter. The electrophoretic mobility particle collector may measure the current of electrophoretic mobility particles $I_e$, the aerodynamic particle collector may measure the current of aerodynamic particles $I_a$, and the filter may measure the current of filtered particles $I_f$. That is, the particle matter analysis device may include three ammeters.

However, when a high voltage is applied to the electrophoretic mobility particle collector at a predetermined period as in the embodiment illustrated in FIG. 10, the current of electrophoretic mobility particles $I_e$, the current of aerodynamic particles $I_a$, and the current of filtered particles $I_f$ may be obtained using two ammeters. That is, the electrophoretic mobility particle collector may not include the ammeter, and only the aerodynamic particle collector and filter may include the ammeter.

Specifically, the power supply may apply a high voltage to the electrophoretic mobility particle collector at regular periods. As an example, as illustrated in FIG. 10, voltages of 0V and 120V may be alternately applied to the electrophoretic mobility particle collector at 15 second intervals. The time interval and applied voltages described above may be an example, and voltages different from those of the example of FIG. 10 may be applied to the electrophoretic mobility particle collector at intervals different from that of the example of FIG. 10.

The particles introduced into the particle matter analysis device may be charged in the charger. When 0V is applied to the electrophoretic mobility particle collector, an electric field is not formed in the electrophoretic mobility particle collector. Therefore, charged particles are not collected in the electrophoretic mobility particle collector. Charged particles may be collected in both aerodynamic particle collectors and filters. Thus, the current measured in the aerodynamic particle collector and filter may be the total current $I_{tot}$.

After a certain time (e.g., 15 seconds), a high voltage (e.g., 120V) may be applied to the electrophoretic mobility particle collector. When the high voltage is applied to the electrophoretic mobility particle collector, an electric field may be formed in the electrophoretic mobility particle collector. Therefore, although electrophoretic mobility particle collector collects charged particles, it is not possible to directly measure the current of electrophoretic mobility particles $I_e$ because the electrophoretic mobility particle collector does not include an ammeter. Some of the charged particles that are not collected by the electrophoretic mobility particle collector are collected by the aerodynamic particle collector, and the aerodynamic particle collector may measure the current of aerodynamic particles $I_a$. The remaining charged particles that are not collected are collected by the filter, and the filter may measure the current of filtered particles $I_f$.

That is, the particle matter analysis device may obtain the total current $I_{tot}$ when a high voltage is not applied to the electrophoretic mobility particle collector (e.g., at 0V). In addition, when a high voltage is applied to the electrophoretic mobility particle collector (e.g., at 120V), the particle matter analysis device may directly obtain the current of aerodynamic particles $I_a$ and the current of filtered particles $I_f$. The particle matter analysis device may indirectly obtain the current of electrophoretic mobility particles $I_e$ by subtracting the collected particle current $I_a$ and the current of filtered particles $I_f$ from the total current $I_{tot}$. Therefore, by periodically applying the high voltage to the electrophoretic mobility particle collector, the particle matter analysis device may directly and indirectly obtain the total current $I_{tot}$, the current of electrophoretic mobility particles $I_e$, the current of aerodynamic particles $I_a$, and the current of filtered particles $I_f$. A process of analyzing density of particles based on the obtained currents and the current ratios are the same as those described above, so a detailed description thereof will be omitted.

Figure 11:
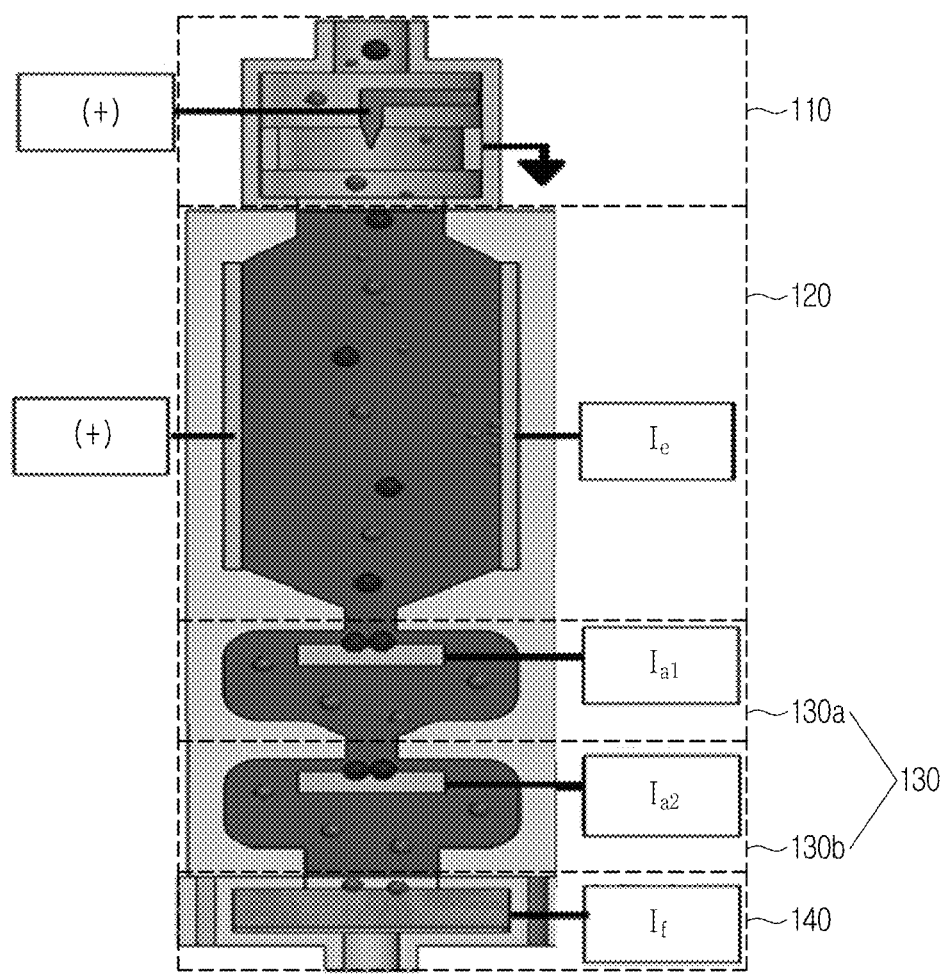
FIG. 11 is a view illustrating a particle matter analysis device according to another embodiment of the disclosure.

FIG. 11 is a view illustrating a particle matter analysis device according to another embodiment of the disclosure.

Referring to FIG. 11, a particle matter analysis device 100a includes a charger 110, an electrophoretic mobility particle collector 120, a first aerodynamic particle collector 130a, a second aerodynamic particle collector 130b, and a filter 140. A structure and current measurement method of each component are the same as described above, so a detailed description thereof will be omitted. However, in the particle matter analysis device 100a of FIG. 11, since a current is measured in each of the first and second aerodynamic particle collectors 130a and 130b, one more equation may be obtained. In the particle matter analysis device 100a of FIG. 11, a total current is expressed by Equation 12.

$$I_{tot} = I_e + I_{a1} + I_{a2} + I_f = \int I(d_e) dd_e = e \cdot Q \int n(d_e) \cdot N(d_e) dd_e \quad \text{(Equation 12)}$$

A current ratio that may be obtained in the particle matter analysis device 100a of FIG. 11 may be a ratio (first current ratio) of the current of electrophoretic mobility particles to the total current $I_{tot}$, a ratio (2-1th current ratio) of a first current of aerodynamic particles to a current of charged particles introduced to the first aerodynamic particle collector, and a ratio (2-2th current ratio) of a second current of aerodynamic particles to the current of charged particles introduced to the second aerodynamic particle collector. Equations of the first to 2-2th current ratios may be expressed by Equation 13 to Equation 15.

$$R_1 = \frac{I_a}{I_{tot}} = \frac{\int \eta_e(d_e) \cdot n(d_e) \cdot N(d_e) dd_e}{\int n(d_e) \cdot N(d_e) dd_e} = \frac{\int_{d_{e,min}}^{d_{e,max}} \eta_e(d_e) \cdot n(d_e) \cdot \frac{1}{d_e} \exp\left(\frac{\log d_e - \log d_{e,m}}{\log \sigma}\right)^2 dd_e}{\int_{d_{e,min}}^{d_{e,max}} n(d_e) \cdot \frac{1}{d_e} \exp\left(\frac{\log d_e - \log d_{e,m}}{\log \sigma}\right)^2 dd_e} \quad \text{(Equation 13)}$$

$$R_2^{(2)} = \frac{I_{a1}}{I_{a1} + I_{a2} + I_f} = \frac{\int (1 - \eta_e(d_e)) \cdot \eta_a^{(1)}(d_a) \cdot n(d_e) \cdot N(d_e) dd_e}{\int (1 - \eta_e(d_e)) \cdot n(d_e) \cdot N(d_e) dd_e} = \frac{\int_{d_{e,min}}^{d_{e,max}} (1 - \eta_e(d_e)) \cdot \eta_a^{(1)}(d_e, \rho_{eff}) \cdot n(d_e) \cdot \frac{1}{d_e} \exp\left(\frac{\log d_e - \log d_{e,m}}{\log \sigma}\right)^2 dd_e}{\int_{d_{e,min}}^{d_{e,max}} (1 - \eta_e(d_e)) \cdot n(d_e) \cdot \frac{1}{d_e} \exp\left(\frac{\log d_e - \log d_{e,m}}{\log \sigma}\right)^2 dd_e} \quad \text{(Equation 14)}$$

$$R_2^{(2)} = \frac{I_{a2}}{I_{a2} + I_f} = \frac{\int (1 - \eta_e(d_e)) \cdot (1 - \eta_a^{(1)}(d_a)) \cdot \eta_a^{(2)}(d_1) \cdot n(d_e) \cdot N(d_e) dd_e}{\int (1 - \eta_e(d_e)) \cdot (1 - \eta_a^{(1)}(d_a)) \cdot n(d_e) \cdot N(d_e) dd_e} = \frac{\int_{d_{e,min}}^{d_{e,max}} (1 - \eta_e(d_e)) \cdot (1 - \eta_a^{(1)}(d_e, \rho_{eff})) \cdot \eta_a^{(2)}(d_e, \rho_{eff}) \cdot n(d_e) \cdot \frac{1}{d_e} \exp\left(\frac{\log d_e - \log d_{e,m}}{\log \sigma}\right)^2 dd_e}{\int_{d_{e,min}}^{d_{e,max}} (1 - \eta_e(d_e)) \cdot (1 - \eta_a^{(1)}(d_e, \rho_{eff})) \cdot n(d_e) \cdot \frac{1}{d_e} \exp\left(\frac{\log d_e - \log d_{e,m}}{\log \sigma}\right)^2 dd_e} \quad \text{(Equation 15)}$$

In Equation 13 to Equation 15, unknowns are an average electrophoretic mobility particle diameter $d_{e,m}$, an effective density $\rho_{eff}$, and a variance value $\sigma$. Since there are three equations and three unknowns, the average electrophoretic mobility particle diameter $d_{e,m}$, the effective density $\rho_{eff}$, and the variance value $\sigma$ may be calculated using Equation 13 to Equation 15. That is, the particle matter analysis device 100a according to the embodiment of FIG. 11 may calculate the variance value as an accurate value, without setting it as a certain value, together with the average electrophoretic mobility particle diameter and the effective density.

Figure 12:
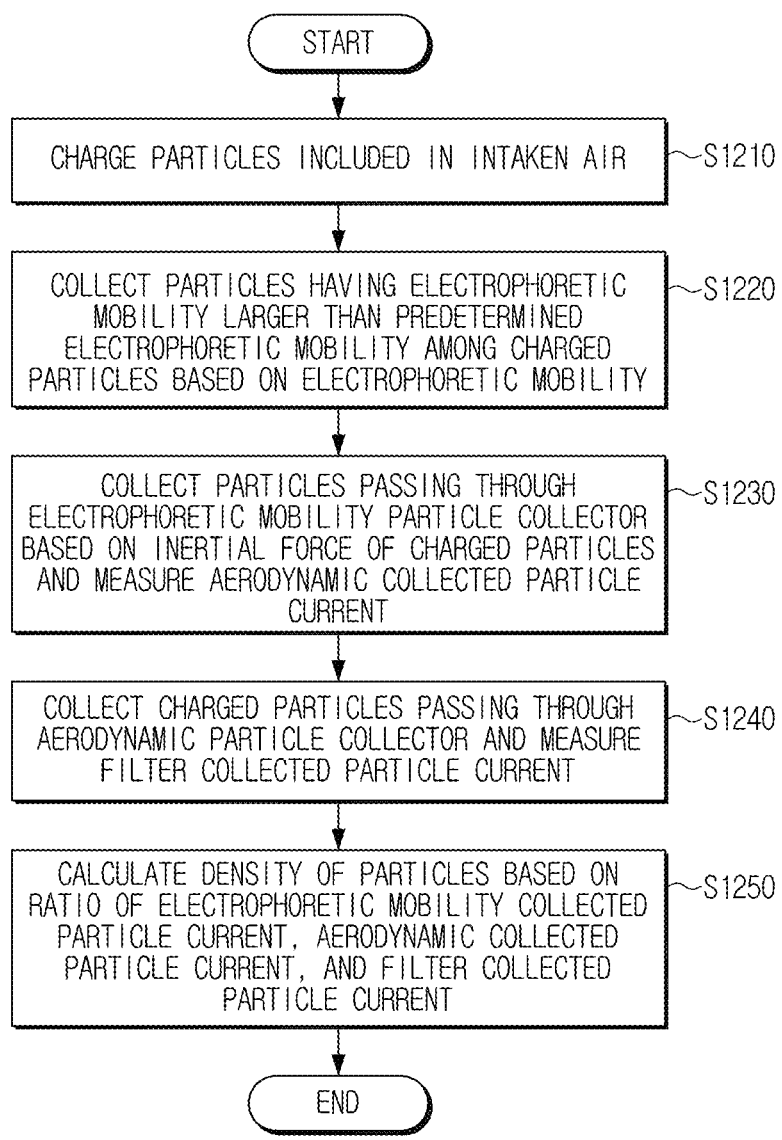
FIG. 12 is a flowchart of a particle matter analysis method according to an embodiment of the disclosure.

FIG. 12 is a flowchart of a particle matter analysis method according to an embodiment of the disclosure.

Referring to FIG. 12, the particle matter analysis device may charge particles contained in intaken air in operation S1210. For example, particles introduced into the particle matter analysis device may be charged with cations.

The particle matter analysis device may collect particles having an electrophoretic mobility greater than a predetermined electrophoretic mobility among charged particles based on the electrophoretic mobility and measure the current of electrophoretic mobility particles in operation S1220. Particles having an electrophoretic mobility smaller than the predetermined electrophoretic mobility may not be collected. The particle matter analysis device may collect charged particles passing through the electrophoretic mobility particle collector based on an inertial force of the charged particles and measure the current of aerodynamic particles in operation S1230. Also, the particle matter analysis device may collect charged particles passing through the aerodynamic particle collector and measure the current of filtered particles in operation S1240.

The particle matter analysis device may calculate density of the particles based on a ratio of the current of electrophoretic mobility particles, the current of aerodynamic particles, and the current of filtered particles in operation S1250. For example, the particle matter analysis device may calculate a total current of the collected particles obtained by adding up the current of electrophoretic mobility particles, the current of aerodynamic particles, and the current of filtered particles, and calculate an average electrophoretic mobility particle diameter based on the ratio of the current of electrophoretic mobility particles to the calculated total currents.

After calculating the average electrophoretic mobility particle diameter, the particle matter analysis device may calculate a total dynamic current of the collected particles obtained by adding up the current of aerodynamic particles and the current of filtered particles, and calculate density of the particles based on the calculated average electrophoretic mobility particle diameter and the current of aerodynamic particles over the total dynamic current. In addition, the particle matter analysis device may calculate a total number concentration of particles based on a predetermined lognormal distribution, a predetermined variance value of a particle distribution, and the calculated average electrophoretic mobility particle diameter.

Meanwhile, the particle matter analysis device may include a plurality of aerodynamic particle collectors. In this case, the particle matter analysis device may collect charged particles passing through the electrophoretic mobility particle collector and measure the first current of aerodynamic particles, and may collect charged particles passing through the first aerodynamic particle collector and measure the second current of aerodynamic particles. Also, the particle matter analysis device may calculate an average electrophoretic mobility collected particle diameter, a variance value of a particle distribution, and density of the particles based on the measured electrophoretic mobility particle diameter, the first current of aerodynamic particles, the second current of aerodynamic particles, and the current of filtered particles.

So far, various embodiments of analyzing the components of the particle matter analysis device and particles have been described. Hereinafter, a manufacturing method of a particle matter analysis device will be described.

FIGS. 13A to 13F are views illustrating a process of manufacturing a particle matter analysis device according to an embodiment of the disclosure.

An electrophoretic mobility particle collector and an aerodynamic particle collector of a particle matter analysis device may be integrally manufactured as a single chip through a micro-electro mechanical systems (MEMS) process.

Figure 13A:
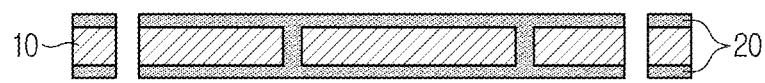
FIG. 13A is a view illustrating a process of plating a metal thin film on a substrate according to an embodiment of the disclosure.

Referring to FIG. 13A, a substrate 10 and a metal thin film 20 plated on the substrate are illustrated. A through hole may be formed in a required portion of the substrate 10, and the metal thin film 20 may be plated. For example, the metal thin film 20 may be plated after the through hole is formed, and the through hole may be formed after the metal thin film 20 is plated. Alternatively, some through holes may be formed, the metal thin film 20 is plated, and the other through holes may then be formed again. The substrate 10 plated with the metal thin film 20 may be manufactured as a first substrate 10a and a second substrate 10b.

Figure 13B:
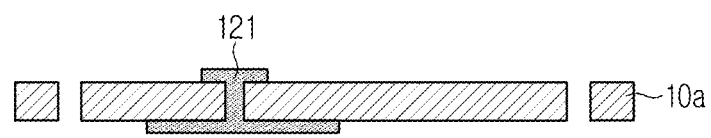
FIG. 13B is a view illustrating a process of patterning a first substrate according to an embodiment of the disclosure.

FIG. 13B shows the first substrate 10a on which an electrode is formed. The electrode may be formed by patterning the metal thin film plated on the first substrate 10a. For example, the electrode formed on the first substrate 10a may be a first electrode 121 to which a high voltage of the electrophoretic mobility particle collector is applied.

Figure 13C:
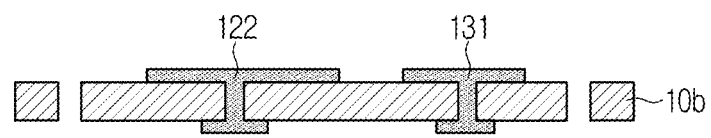
FIG. 13C is a view illustrating a process of patterning a second substrate according to an embodiment of the disclosure.

FIG. 13C shows the second substrate 10b on which an electrode is formed. The electrode may be formed by patterning the metal thin film plated on the second substrate 10b in a similar manner to that of FIG. 13B. For example, the electrode formed on the second substrate 10b may be the second electrode 122 as the ground electrode of the electrophoretic mobility particle collector and the collision electrode 131 of the aerodynamic particle collector.

Figure 13D:
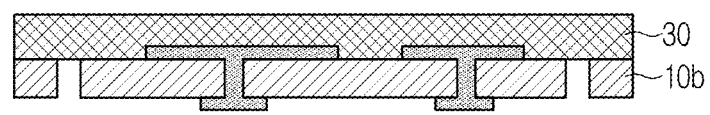
FIG. 13D is a view illustrating a process of plating a photosensitive film according to an embodiment of the disclosure.

FIG. 13D shows the second substrate 10b plated with a photosensitive film 30 is illustrated. As an example, a photosensitive film 30 may be plated on the second substrate 10b on which the electrode is formed. Alternatively, the photosensitive film 30 may be plated on each of the first substrate 10a and the second substrate 10b on which the electrodes are formed. For example, the photosensitive film 30 may include a SU-8 film. The photosensitive film 30 may serve to bond the first substrate 10a and the second substrate 10b and form channels of the electrophoretic mobility particle collector and aerodynamic particle collector.

Figure 13E:
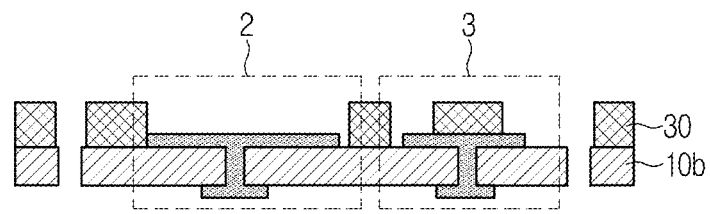
FIG. 13E is a view illustrating a process of forming each region of a particle matter analysis device according to an embodiment of the disclosure.

FIG. 13E shows the second substrate 10b with channels formed therein. The photosensitive film plated on the second substrate 10b may be patterned to form a channel. As described above, the channel may refer to an internal space of the collector. Referring to FIG. 13E, the photosensitive film is patterned and a channel 2 of the electrophoretic mobility particle collector and a channel 3 of the aerodynamic particle collector are formed. For example, when a photosensitive film is also plated on the first substrate 10a, a channel may be formed in a region of the first substrate 10a corresponding to the channel region formed in the second substrate 10b through the same process as described above. The second substrate 10b (or the first and second substrates) including the channel region formed by patterning the photosensitive film 30 may be plasma-treated and a surface of the photosensitive film 30 may be activated. The second substrate 10b in which the surface of the photosensitive film 30 is activated may be bonded with the first substrate 10a by applying heat and pressure.

Figure 13F:
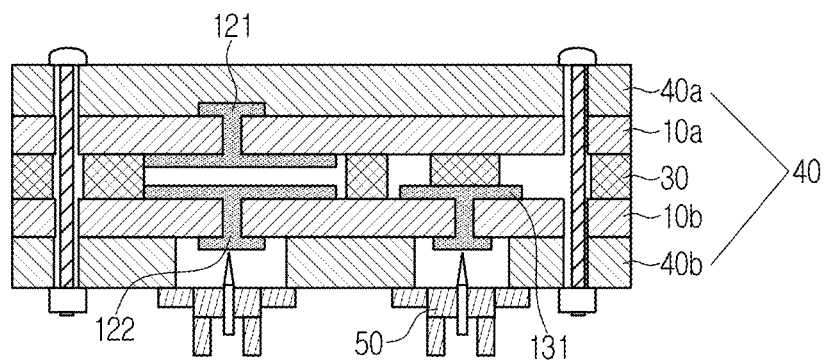
FIG. 13F is a view illustrating a process of manufacturing a particle matter analysis device according to an embodiment of the disclosure.

FIG. 13F shows a completed particle matter analysis device. The first electrode 121 may be formed on the first substrate 10a, and the second electrode 122 and the collision electrode 131 may be formed on the second substrate 10b. The photosensitive film 30 located between the first substrate 10a and the second substrate 10b may bond the first substrate 10a and the second substrate 10b and form a channel of the collector. A shielding case 40 is packaged outside the bonded first and second substrates 10a and 10b, and a connector 50 for measuring current or applying a high voltage may be connected to each electrode.

Figure 14:
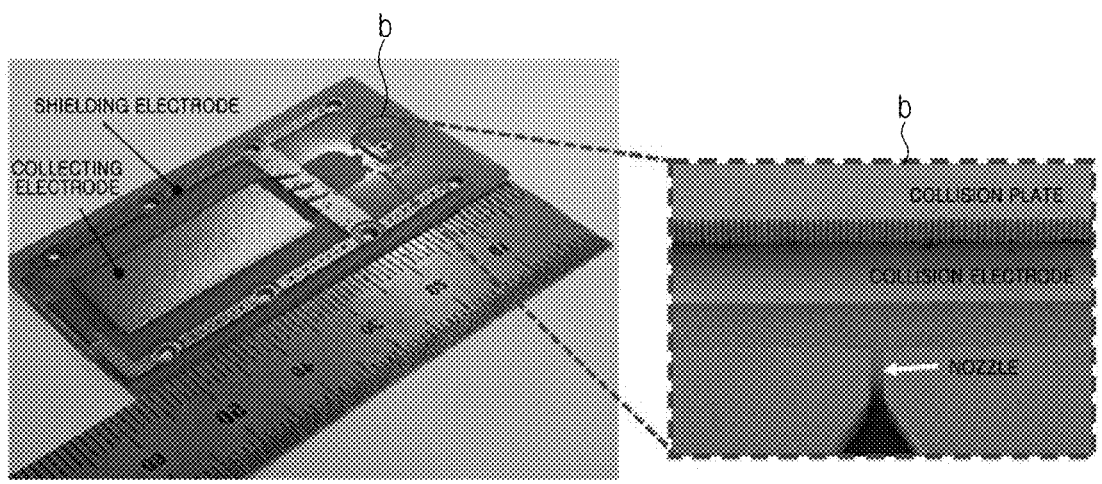
FIG. 14 is a view illustrating a micro-electro mechanical systems (MEMS)-based particle matter analysis device in which an electrode is formed according to an embodiment of the disclosure.

FIG. 14 is a view illustrating an MEMS-based particle matter analysis device in which an electrode is formed according to an embodiment of the disclosure.

Referring to FIG. 14, a particle matter analysis device in which an electrode is formed is illustrated. As described above, the electrophoretic mobility particle collector may have a plate-shaped collecting electrode (second electrode) disposed on one surface thereof. Three orifices are formed in a nozzle region. An electrode is formed in the aerodynamic particle collector. An enlarged view of the electrode of the aerodynamic particle collector is shown in b. The electrode of the aerodynamic particle collector may include a nozzle through which particles move from the electrophoretic mobility particle collector, a collision electrode, and a collision plate. A shielding electrode for shielding channels and an electric field from the outside may be formed at an outer region of the electrophoretic mobility particle collector and an outer region of the aerodynamic particle collector. The particle matter analysis device of the disclosure may be realized as a MEMS-based compact device for portability. That is, as illustrated in FIG. 14, a total length of the electrophoretic mobility particle collector and the aerodynamic particle collector may be about 5.5 cm.

Figure 15:
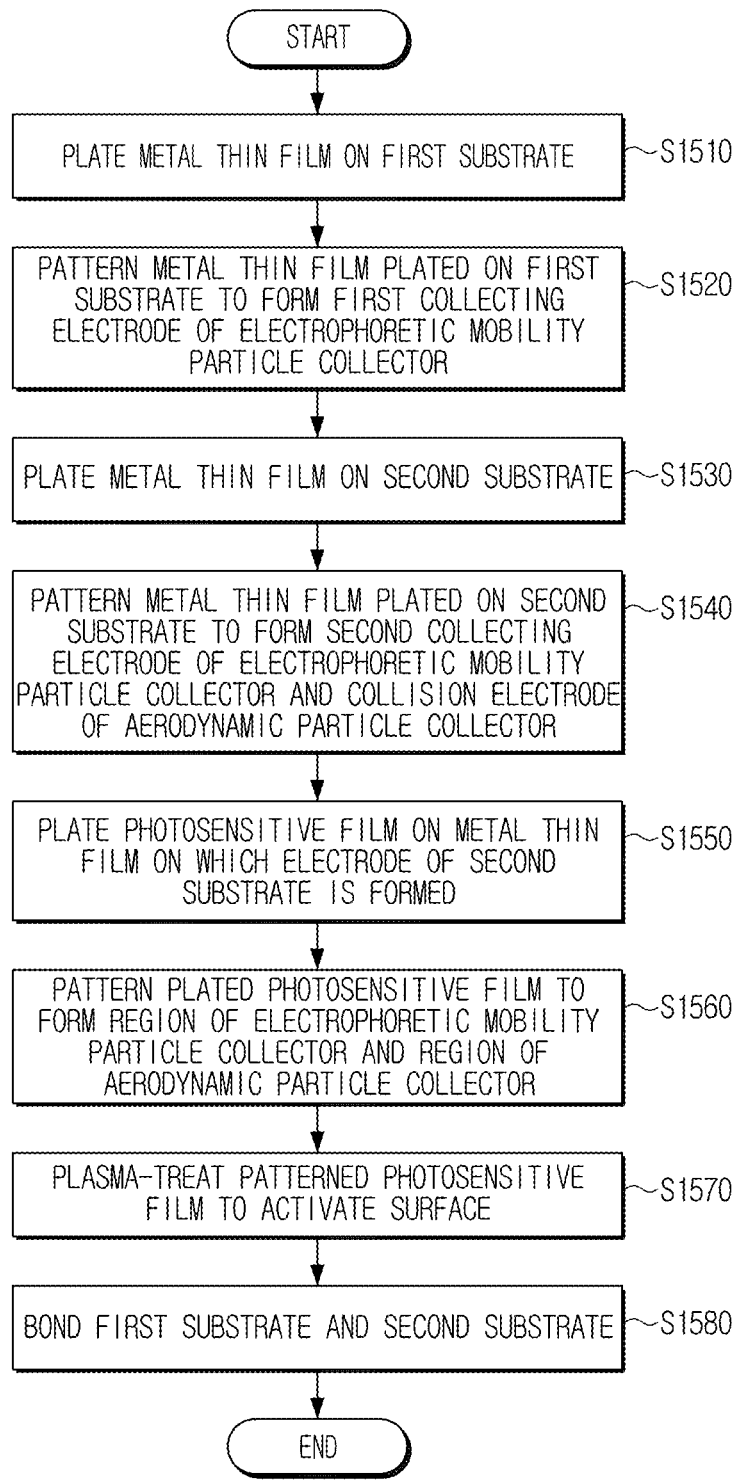
FIG. 15 is a flowchart of a manufacturing method of a particle matter analysis device according to an embodiment of the disclosure.

FIG. 15 is a flowchart of a method for manufacturing a particle matter analysis device according to an embodiment of the disclosure.

Referring to FIG. 15, in the manufacturing of the particle matter analysis device, first, a metal thin film may be plated on a first substrate (S1510), and the metal thin film plated on the first substrate may be patterned to form a first electrode of an electrophoretic mobility particle collector (S1520).

Next, a metal thin film may be plated on a second substrate (S1530), and the metal thin film plated on the second substrate may be patterned to form a second electrode of the electrophoretic mobility particle collector and a collision electrode of an aerodynamic particle collector (S1540).

After the electrodes are formed on the first and second substrates, a photosensitive film may be plated on the metal thin film on which the electrode of the second substrate is formed (S1550). The plated photosensitive film may be patterned to form a region (channel) of the electrophoretic mobility particle collector and a region (channel) of the aerodynamic particle collector (S1560).

The patterned photosensitive film may be plasma-treated to activate a surface thereof (S1570), and the first substrate and the second substrate may be bonded in a state where heat and pressure are applied (S1580). An outer side of the bonded first and second substrates may be packaged by a shielding case. In addition, a charger and a filter may be connected to a particle matter analysis module in which the electrophoretic mobility particle collector and the aerodynamic particle collector are manufactured based on an MEMS, and a connector for measuring a current or applying a high voltage, a processor for calculating density or the like may be connected thereto, thereby completing a particle matter analysis device.

As described above, the particle matter analysis device according to an embodiment of the disclosure may accurately measure a density of particles contained in the air in real time. In addition, since the particle matter analysis device can be embedded in a single integrated chip, the particle matter analysis device enables miniaturization and low cost production, easy transportation, and easy application to various industrial fields. In addition, because a high-precision density value may be obtained, accuracy of measurement of a mass concentration may be remarkably improved compared to the related art method of calculating a mass concentration by uniformly applying a certain density value.

The particle matter analysis method according to various embodiments described above may be provided as a computer program product. The computer program product may include the S/W program itself or a non-transitory computer readable medium storing the S/W program.

The non-transitory computer readable medium is a medium that semi-permanently stores data therein, rather than a medium storing data for a short time such as a register, a cache, a memory, or the like, and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. A particle matter analysis device comprising:
a charger configured to receive power from a power supply device and to charge particles included in intaken air;
an electrophoretic mobility particle collector configured to collect particles having electrophoretic mobility greater than a predetermined electrophoretic mobility among the charged particles based on an electrophoretic mobility and to measure a current of electrophoretic mobility particles;
an aerodynamic particle collector configured to collect charged particles passing through the electrophoretic mobility particle collector based on an inertial force of the charged particles and to measure a current of aerodynamic particles;
a filter configured to collect charged particles passing through the aerodynamic particle collector and to measure a current of filtered particles; and
a processor,
wherein the processor calculates a density of the particles based on a ratio of the current of electrophoretic mobility particles, the current of aerodynamic particles, and the current of filtered particles.

2. The particle matter analysis device as claimed in claim 1, wherein
the processor is configured to calculate an overall current of the collected particles obtained by adding up the current of electrophoretic mobility particles, the current of aerodynamic particles, and the current of filtered particles, to calculate an average electrophoretic mobility particle diameter based on a ratio of the current of electrophoretic mobility particles to the calculated overall current, to calculate a dynamic overall current of the collected particles obtained by adding up the current of aerodynamic particles and the current of filtered particles, and to calculate a density of the particles based on the calculated average electrophoretic mobility particle diameter and the current of aerodynamic particles with respect to the calculated dynamic overall current.

3. The particle matter analysis device as claimed in claim 2, wherein
the processor is configured to calculate a total number concentration of the particles based on a predetermined log-normal distribution, a predetermined variance value of a particle distribution, and the calculated average electrophoretic mobility particle diameter.

4. The particle matter analysis device as claimed in claim 1, further comprising a nozzle including a multi-orifice including a plurality of flow paths arranged between the electrophoretic mobility particle collector and the aerodynamic particle collector and narrowing from the electrophoretic mobility particle collector toward the aerodynamic particle collector.

5. The particle matter analysis device as claimed in claim 1, wherein
the aerodynamic particle collector comprises:
a first aerodynamic particle collector configured to collect charged particles passing through the electrophoretic mobility particle collector and to measure a first current of aerodynamic particles; and
a second aerodynamic particle collector configured to collect charged particles passing through the first aerodynamic particle collector and to measure a second current of aerodynamic particles.

6. The particle matter analysis device as claimed in claim 5, wherein
the processor is configured to calculate an average electrophoretic mobility particle diameter, a variance value of particle distribution and a particle density based on the measured current of electrophoretic mobility particles, the first current of aerodynamic particles, the second current of aerodynamic particles, and the current of filtered particles.

7. The particle matter analysis device as claimed in claim 1, wherein the electrophoretic mobility particle collector and the aerodynamic particle collector are integrally formed on one chip through a micro-electro mechanical systems (MEMS) process.

8. The particle matter analysis device as claimed in claim 1, wherein
the electrophoretic mobility particle collector comprises first and second electrodes spaced apart from each other in a facing manner in a direction perpendicular to a flow direction in which the charged particles move,
wherein the first and second electrodes form a uniform electric field in a direction from the first electrode to the second electrode upon receiving a predetermined voltage from the power supply device, and the second electrode collects particles having an electrophoretic mobility greater than a predetermined electrophoretic mobility.

9. A particle matter analysis method comprising:
charging particles included in intaken air;
collecting particles having an electrophoretic mobility greater than a predetermined electrophoretic mobility among the charged particles based on the electrophoretic mobility and measuring a current of electrophoretic mobility particles;
collecting charged particles passing through an electrophoretic mobility particle collector based on an inertial force of the charged particles and measuring a current of aerodynamic particles;
collecting charged particles passing through an aerodynamic particle collector and measuring a current of filtered particles; and
calculating a density of the particles based on a ratio of the current of electrophoretic mobility particles, the current of aerodynamic particles, and the current of filtered particles.

10. The particle matter analysis method as claimed in claim 9, wherein
the calculating of a density of particles comprises calculating an overall current of the collected particles obtained by adding up the current of electrophoretic mobility particles, the current of aerodynamic particles, and the current of filtered particles, calculating an average electrophoretic mobility particle diameter based on a ratio of the current of electrophoretic mobility particles to the calculated overall current, calculating a dynamic overall current of the collected particles obtained by adding up the current of aerodynamic particles and the current of filtered particles, and calculating a density of the particles based on the calculated average electrophoretic mobility particle diameter and the current of aerodynamic particles with respect to the calculated dynamic overall current.

11. The particle matter analysis method as claimed in claim 10, further comprising:
calculating a total number concentration of the particles based on a predetermined log-normal distribution, a predetermined variance value of a particle distribution, and the calculated average electrophoretic mobility particle diameter.

12. The particle matter analysis method as claimed in claim 9, wherein the measuring of the current of aerodynamic particles comprises collecting charged particles passing through the electrophoretic mobility particle collector and measuring a first current of aerodynamic particles, and collecting charged particles passing through a first aerodynamic particle collector and measuring a second current of aerodynamic particles.

13. The particle matter analysis method as claimed in claim 12, wherein
the calculating of a density of particles comprises calculating an average electrophoretic mobility particle diameter, a variance value of particle distribution and a particle density based on the measured current of electrophoretic mobility particles, the first current of aerodynamic particles, the second current of aerodynamic particles, and the current of filtered particles.

* * * * *